United States Patent [19]

Cobb

[11] Patent Number: 5,098,333
[45] Date of Patent: Mar. 24, 1992

[54] METHOD AND APPARATUS FOR REMOVING VISCERA FROM POULTRY CARCASSES

[75] Inventor: George Cobb, Cambridge, Canada

[73] Assignee: Meyn Canada Poultry Inc., Cambridge, Canada

[21] Appl. No.: 500,836

[22] Filed: Mar. 29, 1990

[51] Int. Cl.⁵ ............................................ A22C 11/00
[52] U.S. Cl. ..................................... 452/106; 452/117
[58] Field of Search ............... 452/106, 111, 112, 117, 452/118, 179

[56] References Cited

U.S. PATENT DOCUMENTS

| | | | |
|---|---|---|---|
| 2,830,319 | 4/1958 | Muntz | 17/11 |
| 3,380,113 | 4/1968 | Zebarth et al. | 17/11 |
| 3,416,186 | 12/1968 | Zebarth et al. | 17/11 |
| 3,474,492 | 10/1969 | Viscolosi | 17/11 |
| 3,555,593 | 1/1971 | Scheier | 17/11 |
| 3,605,179 | 9/1971 | Harben Jr. | 17/11 |
| 3,663,991 | 5/1972 | Harben Jr. | 17/11 |
| 3,685,096 | 8/1972 | Harben Jr. | 17/11 |
| 3,711,897 | 1/1973 | Viscolosi | 17/11 |
| 3,802,028 | 4/1974 | Scheier et al. | 17/11 |
| 3,886,635 | 6/1975 | Meyn | 17/11 |
| 3,902,221 | 9/1975 | Harben Jr. et al. | 17/11 |
| 4,019,222 | 4/1977 | Scheier et al. | 17/11 |
| 4,092,762 | 6/1978 | Ochlyski | 17/11 |
| 4,262,387 | 4/1981 | Scheier et al. | 452/117 |
| 4,467,498 | 8/1984 | Graham et al. | 17/11 |
| 4,538,325 | 9/1985 | Harben Jr. et al. | 17/11 |
| 4,561,148 | 12/1985 | Bonuchi et al. | 17/11 |
| 4,951,352 | 8/1990 | Harben, III et al. | 452/106 |

Primary Examiner—Willis Little
Attorney, Agent, or Firm—Joseph A. Day

[57] ABSTRACT

A method and apparatus for removing viscera from poultry carcasses during processing is described comprising a frame which has a tilting means mounted thereon to tilt the carcasses so that the viscera hang sufficiently away from the carcasses to allow them to be mechanically grasped. A grasping means is mounted on the frame for grasping the viscera after the carcasses are tilted, and a pulling means is mounted on the frame for pulling the grasped viscera from the carcasses. In a preferred embodiment of the invention, the tilting means comprises at least one guide bar, disposed in such a manner that as the carcasses move along on the shackle line, they strike the guide bar and are tilted. The grasping means of the preferred embodiment of the invention comprise a pair of side-by-side, spaced apart rails, the distance between which progressively decreases along their length to the point that viscera may be substantially grasped between the rails. The pulling means comprise a pair of side-by-side, spaced apart rails, which rails progressively slope away from the shackle line along their length to the point that when the viscera of the carcasses are grasped by the rails and the carcasses continue to move along on the shackle line, the viscera will be pulled from the carcasses by the rails progressively sloping away from the shackle line.

7 Claims, 3 Drawing Sheets

METHOD AND APPARATUS FOR REMOVING VISCERA FROM POULTRY CARCASSES

BACKGROUND OF THE INVENTION

This invention relates generally to a method and apparatus for removing viscera from poultry carcasses during processing, and more specifically to a method for removing viscera from poultry carcasses after the carcasses have been eviscerated and the viscera have been inspected to detect diseased birds.

SUMMARY OF THE INVENTION

The apparatus of the present invention is used in situations where the carcasses are suspended from a shackle line which moves the carcasses through processing. This apparatus for removing the viscera comprises a frame which has a tilting means mounted thereon to tilt the carcasses so that the viscera hang sufficiently away from the carcasses to allow them to be grasped. A grasping means is mounted on the frame for grasping the viscera after the carcasses are tilted, and a pulling means is mounted on the frame for pulling the grasped viscera from the carcasses.

In a preferred embodiment of the invention, the tilting means comprises at least one guide bar, disposed in such a manner that as the carcasses move along on the shackle line, they strike the guide bar and are tilted. The grasping means of the preferred embodiment of the invention comprises a pair of side-by-side, spaced apart rails, the distance between which progressively decreases along their length to the point that viscera maybe substantially grasped between the rails. The pulling means comprises a pair of side-by-side, spaced apart rails, which rails progressively slope away from the shackle line along their length to the point that when the viscera of the carcasses are grasped by the rails and the carcasses continue to move along on the shackle line, the viscera will be pulled from the carcasses by the rails progressively sloping away from the shackle line.

The method of removing viscera from poultry carcasses using the apparatus of the present invention comprises the steps of:
  tilting the carcasses by way of a tilting means so that the viscera hang sufficiently away from the carcasses to allow them to be grasped;
  grasping the viscera with a grasping means after the carcasses are tilted;
  pulling the grasped viscera from the carcasses with a pulling means.

BRIEF DESCRIPTION OF THE DRAWINGS

The preferred embodiment of the present invention will now be described with the aid of the following drawings, in which.

DETAILED DESCRIPTION OF THE PREFERRED EMBODIMENT

Figure 1A:
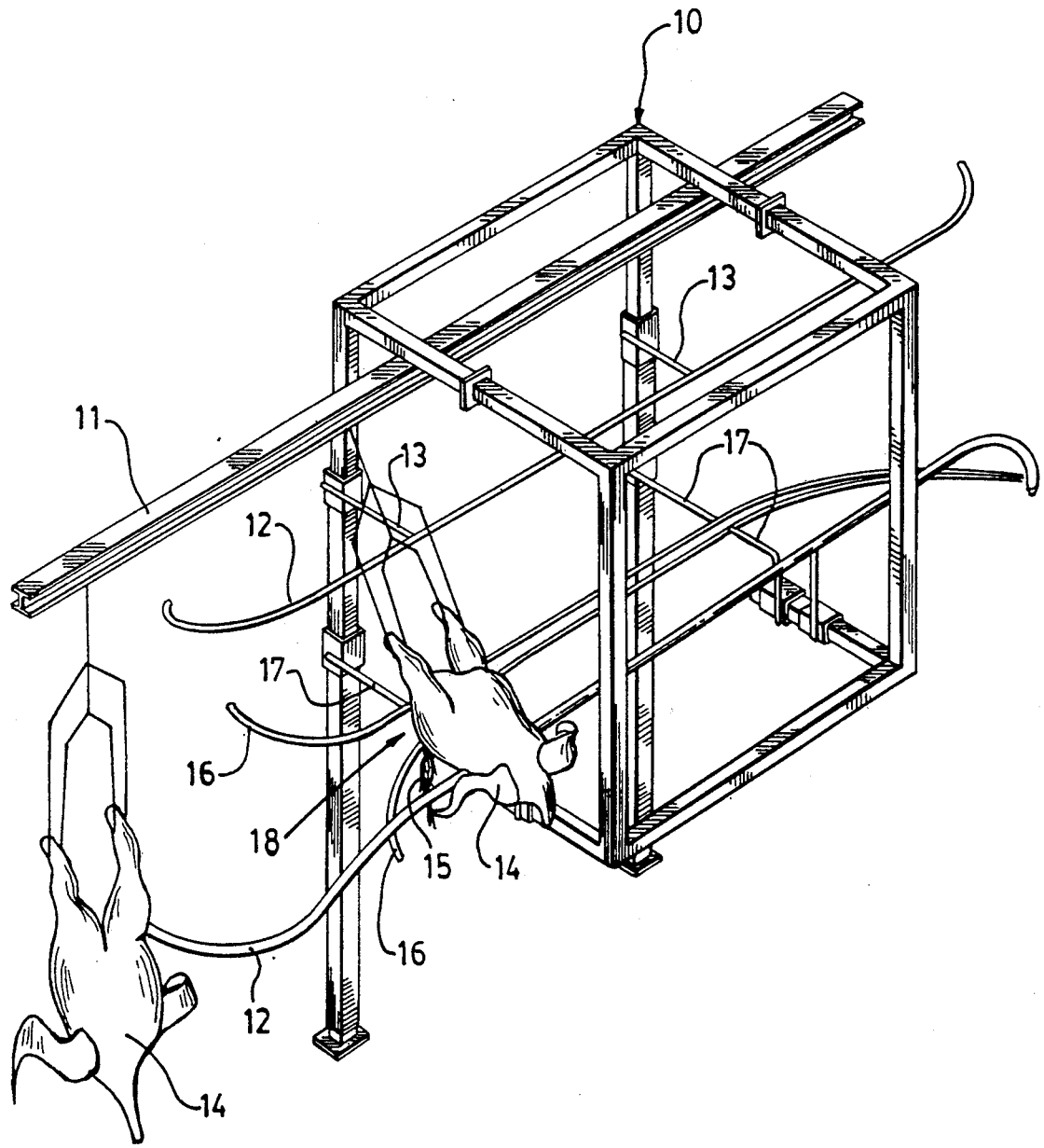
FIG. 1A is a perspective view of the apparatus for removing viscera from poultry carcasses in accordance with the present invention.
Figure 1B:
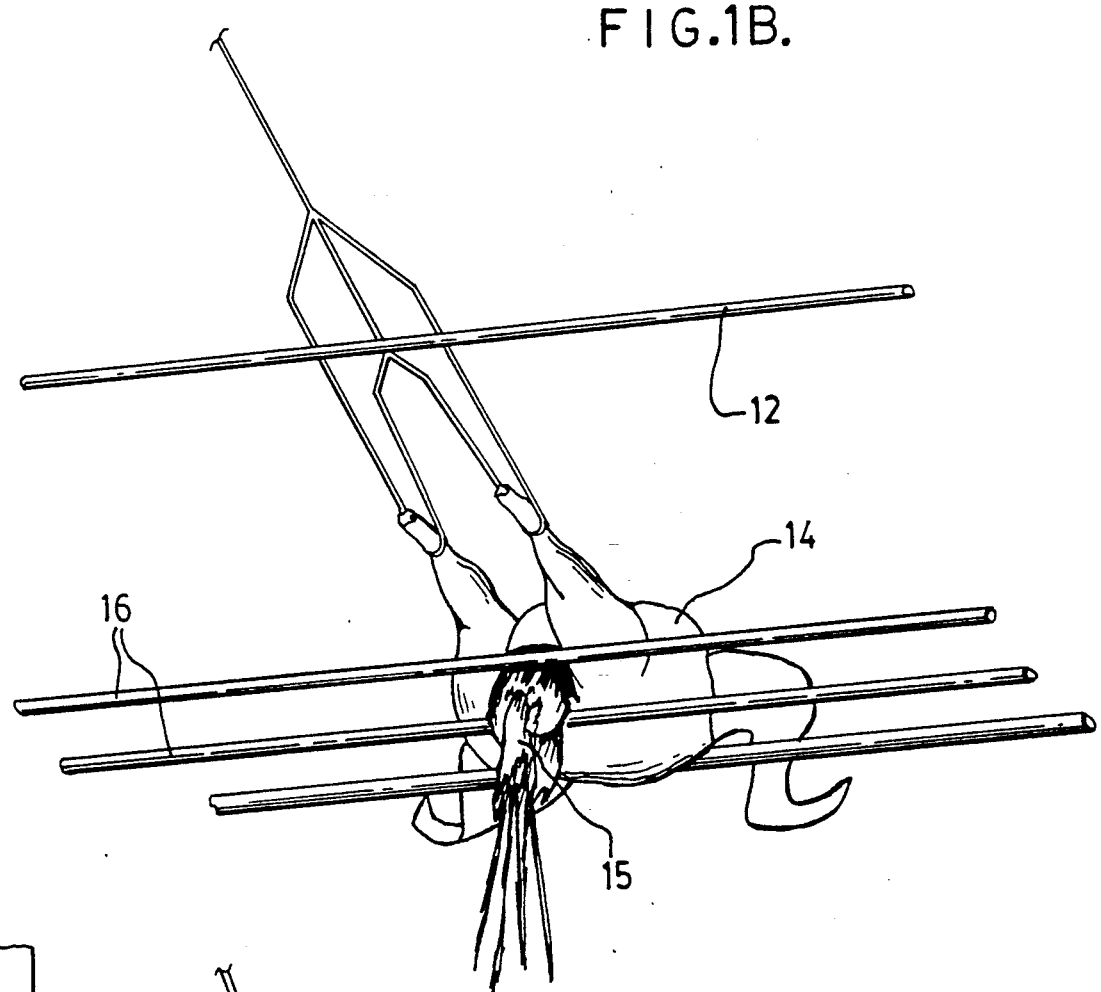
FIG. 1B is a back view of the poultry carcass in relation to the apparatus.
Figure 1C:
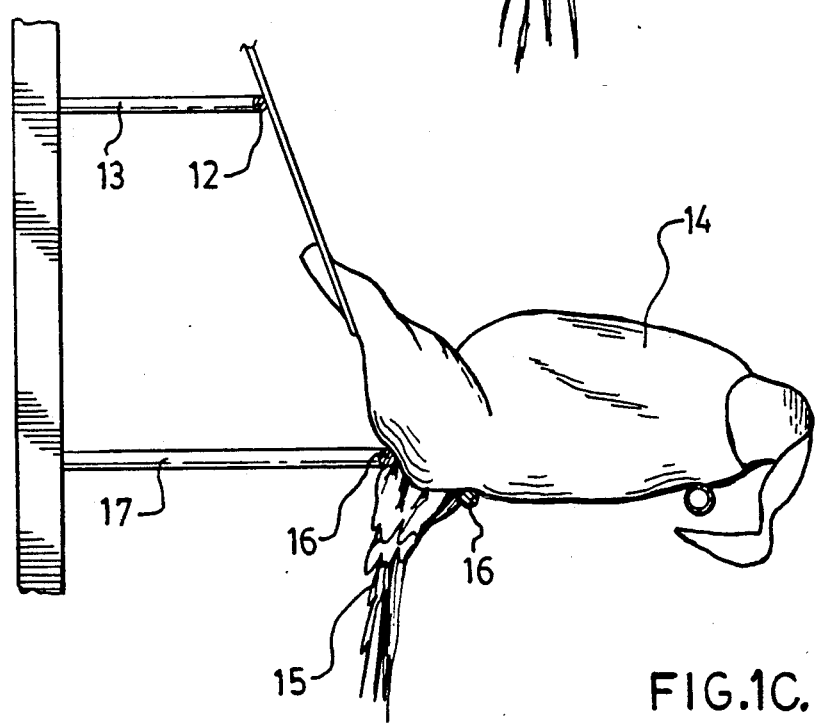
FIG. 1C is a side view of the poultry carcass in relation to the apparatus.
Figure 2:
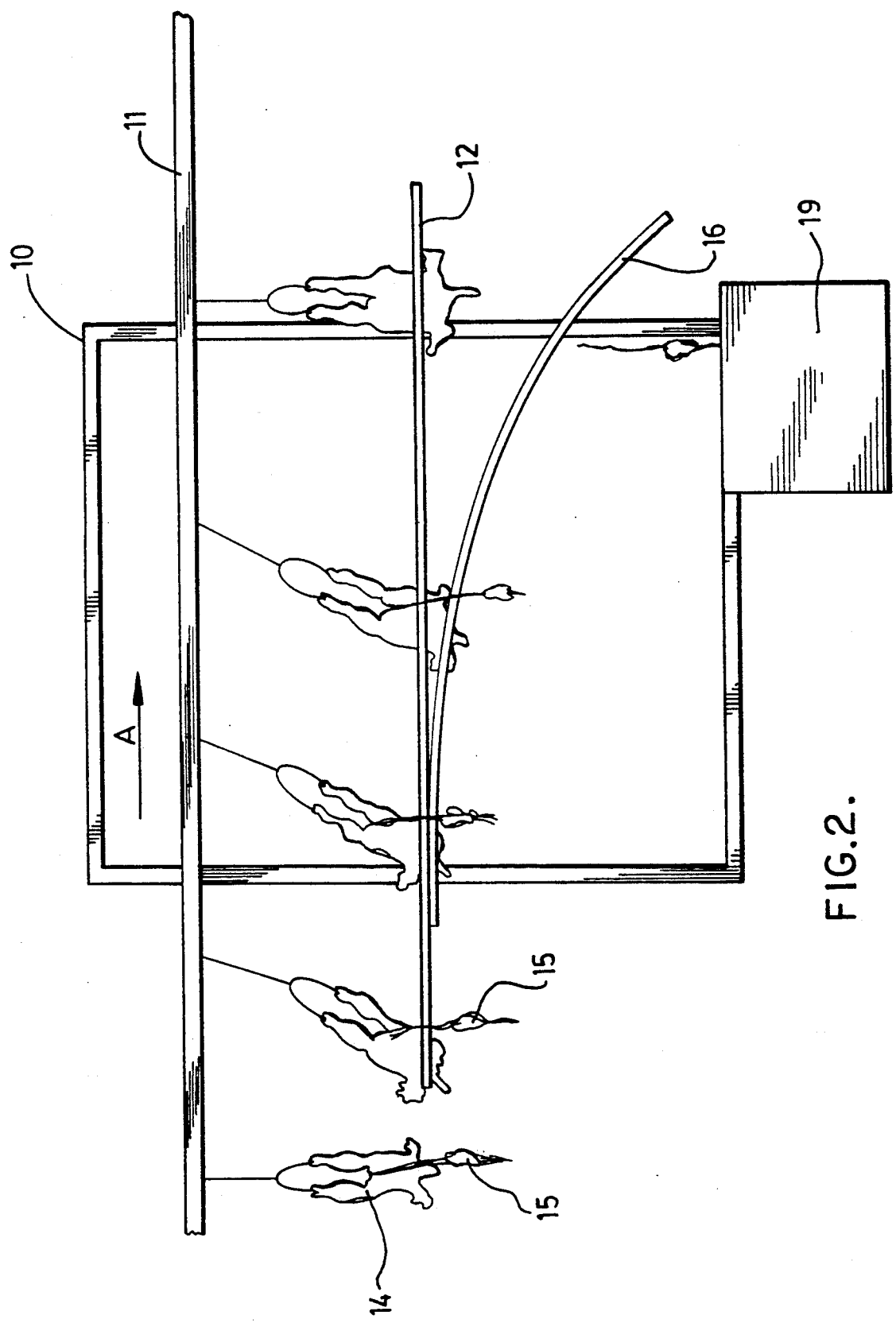
FIG. 2 is a side view of the apparatus showing the viscera being removed from poultry carcasses by the apparatus.

Referring to FIGS. 1 and 2, there is shown a frame 10 which has a shackle line 11 passing therethrough. The shackle line 11 moves poultry carcasses through the various stages of processing.

At least one guide bar 12 is mounted onto the frame 10 by way of guide bar supports 13. The guide bar 12 is adapted to tilt the carcasses 14 so that the viscera 15 hang sufficiently away from the carcasses to allow them to be grasped.

A pair of side-by-side, spaced-apart rails 16 are mounted on the frame 10 by way of rail supports 17. The distance between the two rails 16 progressively decreases along their length, as shown in FIG. 1, to the point that viscera 15 hanging from the tilted carcasses 14 may be substantially grasped between the rails 16.

As can be seen from FIG. 1, the rails 16 progressively slope away from the shackle line 11 along their length, to the point that when the viscera 15 of a carcass are grasped by the rails 16 and the carcass continues to move along on the shackle line in the direction of the arrow A, the viscera will be pulled from the carcass by the rails 16. It will be understood by those skilled in the art that any other suitable form of viscera pulling means may be provided on the apparatus to pull viscera which are grasped between the rails 16 from the carcasses.

The apparatus is used in the following manner:

The shackle line 11 moves carcasses 14, which have been previously eviscerated and had their viscera inspected for detection of diseased birds, towards the frame 10. The carcasses 14 are suspended by the legs and they approach the frame in a side-first position. When the carcasses strike the guide bar 12 they are tilted in such a manner that the viscera 15 hang over the back of the carcass. The tilted carcasses then proceed on the shackle line 11 until the viscera 15 enter the gap 18 between the rails 16. As the gap 18 between the rails 16 narrows, the viscera 15 are grasped by the rails 16. At this point, the major organs contained in the viscera lie below the rails 16 as shown in FIG. 2. The rails 16 progressively slope away from the shackle line 11, and the combination of the movement of the carcass 14 on the shackle line 11, the increasing distance between the rails 16 and the shackle line 11, and the narrowing gap 18 between the rails 16, cause the viscera 15 to be pulled from the carcass 14 and separated therefrom. The viscera 15 then drop into a container 19 for further processing/disposal.

It has been found that the pulling force exerted by the above-described apparatus is sufficient to pull all the viscera from inside the carcass, leaving the carcass ready for the next step in processing.

The method of removing viscera from poultry carcasses can therefore be accomplished by the steps of:
  a) tilting the carcass 14 by way of a tilting means so that the viscera 15 hang sufficiently away from the carcass to allow them to be grasped;
  b) grasping the viscera 15 with a grasping means after the carcass is tilted;
  c) pulling the grasped viscera 15 from the carcass 14 with a pulling means.

In the case of the preferred embodiment of the invention, the viscera are removed from a poultry carcass by the steps of:
  a) tilting the carcass 14 by allowing the carcass to strike the guide bar 12 of the above-described apparatus, said carcass being tilted in such a manner that the viscera hang sufficiently away from the carcass to allow them to be grasped;

b) grasping the viscera between two side-by-side, spaced-apart rails 16, the distance between which progressively decreases along their length to grasp the viscera therebetween;

c) pulling the grasped viscera 15 from the carcass 14.

Variations in the present invention will be obvious to those skilled in the art, and all such obvious variations are contemplated to fall within the scope of this invention.

Embodiments of the invention in which an exclusive property or privilege is claimed are defined as follows:

1. Method of removing viscera from a poultry carcass where said carcass is suspended from a shackle line by the legs which moves the carcass through processing, said method comprising the steps of:

tilting the carcass by way of a tilting means so that the viscera hang over the back and sufficiently away from the carcass to allow them to be mechanically grasped;

mechanically grasping the viscera with a grasping means after the carcass is tilted said grasping means comprising a pair of side-by-side, spaced apart rails, the distance between which progressively decreases along their length to the point that viscera may be substantially grasped between the rails;

mechanically pulling the grasped viscera from the carcass with a pulling means.

2. Method of removing viscera from a poultry carcass as defined in claim 1, wherein the tilting means comprises at least one guide bar, so that as the carcass moves along on the shackle line, with its back against the guide bar, it is tilted such that the head of the carcass is moved away from the grasping means.

3. Method of removing viscera from a poultry carcass as defined in claim 2, wherein the pulling means comprises a pair of side-by-side, spaced apart rails, which rails progressively slope away from the shackle line along their length to the point that when the viscera of a carcass are grasped by the rails and the carcass continues to move along on the shackle line, the viscera will be pulled from the carcass by the rails progressively sloping away from the shackle line, thereby separating the viscera from the carcass.

4. Method of detaching viscera from a poultry carcass suspended from a shackle line using an apparatus comprising a frame having a guide bar mounted thereon for tilting carcasses, and having a pair of side-by-side, spaced apart rails mounted thereon, the distance between which progressively decreases along their length to grasp viscera therebetween; said method comprising the steps of:

a) tilting the carcasses by causing the back of the carcass to run along the guide bar, said carcass being tilted in such a manner that the viscera hang sufficiently away from the carcasses to allow them to be mechanically grasped by said rails;

b) mechanically grasping the viscera between the said rails;

c) mechanically pulling the grasped viscera from the carcasses using a pulling means such that the viscera is detached from the carcass.

5. A method of detaching viscera from poultry carcasses as defined in claim 4, wherein the pulling means comprises a pair of side-by-side, spaced apart rails, which rails progressively slope away from the shackle line along their length to the point that when the viscera of a carcass are grasped by the rails and the carcass continues to move along on the shackle line, the viscera will be pulled from the carcass by the rails progressively sloping away from the shackle line thereby detaching the viscera from the carcass.

6. Apparatus for removing viscera from a poultry carcass where the carcass is suspended from a shackle line by the legs which moves the carcass through processing side first said apparatus comprising:

a frame having tilting means mounted thereon to tilt the carcass so that the viscera hang over the back and sufficiently away from the carcass to allow them to be mechanically grasped;

grasping means mounted on the frame for mechanically grasping the viscera after the carcass is tilted, said grasping means comprising a pair of side-by-side, spaced apart rails, the distance between which progressively decreases along their length to the point that viscera may be substantially grasped between the rails;

pulling means mounted on the frame for mechanically pulling the grasped viscera from the carcass.

7. Apparatus as defined in claim 6, wherein the tilting means comprises at least one guide bar disposed in such a manner that as the carcass moves along on the shackle line, with its back against the guide bard, it is tilted such that the head of the carcass is moved away from the grasping means.

* * * * *